Patented June 15, 1943

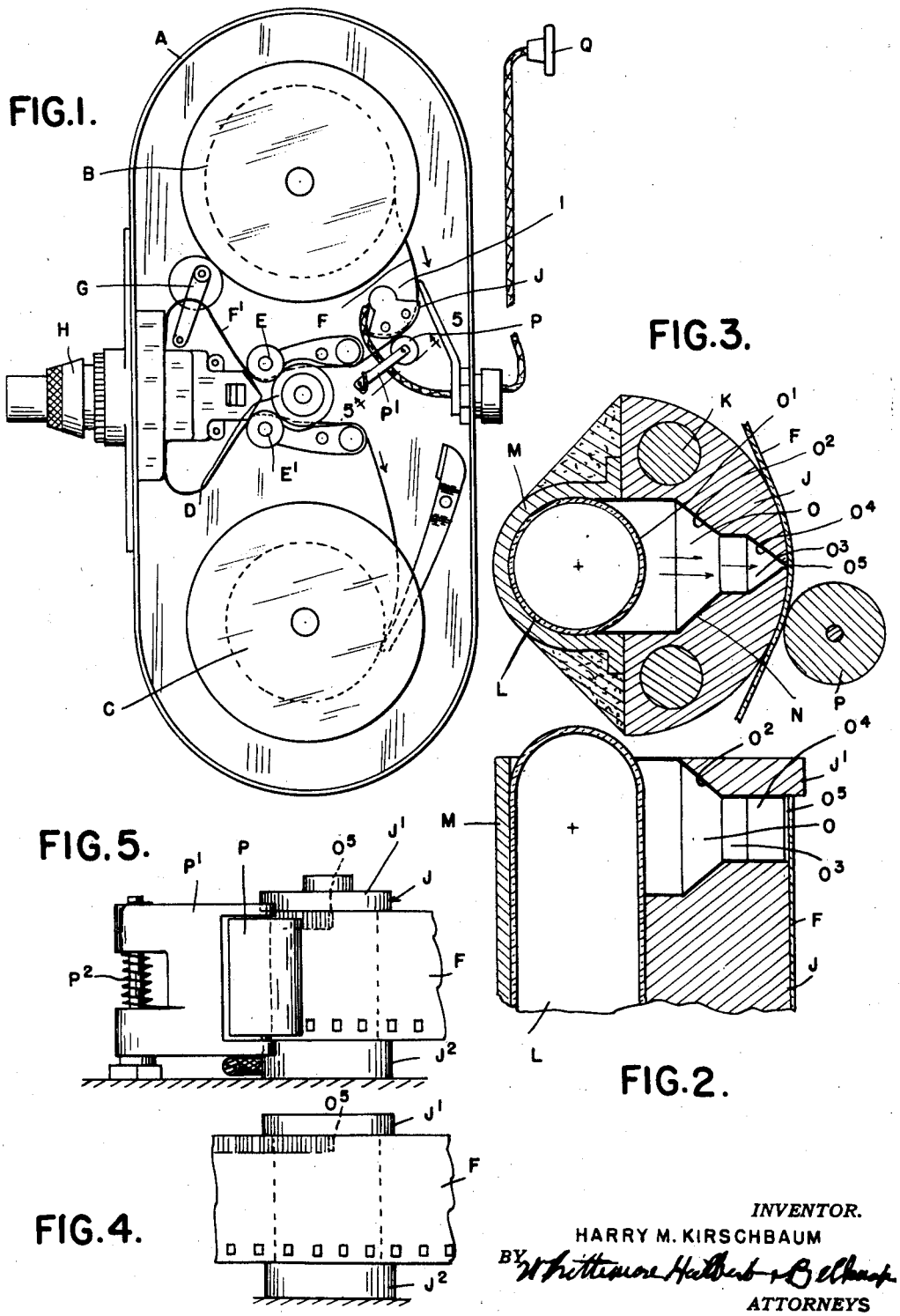

2,322,144

UNITED STATES PATENT OFFICE 2,322,144

SOUND RECORDING MEANS FOR MOTION PICTURE CAMERAS

Harry M. Kirschbaum, Detroit, Mich.

Application September 4, 1941, Serial No. 409,579

1 Claim. (Cl. 179—100.3)

The invention relates to sound recording means for motion picture cameras, and it is the object of the invention to obtain a construction which is applicable to the ordinary small motion picture camera such as used by amateurs. To this end the invention consists in the construction as hereinafter set forth.

In the drawing:

Fig. 1 is a diagrammatic elevation of a small motion picture camera showing my improved sound recording means attached thereto;

Fig. 2 is an enlarged longitudinal section through the sound recording means;

Fig. 3 is a cross section thereof;

Fig 4 is an elevation showing a portion of the film strip on which the sound record has been made; and Fig. 5 is a section taken on the line 5—5 of Fig. 1.

Sound recorders used in motion picture cameras are usually quite complex in construction and, because of their dimensions, are only applicable to large size motion picture cameras. The small motion picture cameras used by most amateurs have but little empty space within the casing, and to place sound recording means therein necessitates a complete reconstruction of such means. Furthermore, the usual type of recorder, even if made on a small scale, could not be placed within such a camera.

To overcome this difficulty, I have devised a construction, the dimensions of which are so restricted that it may easily be placed within the casing of small size motion picture cameras and in operative relation to the picture recording mechanism so as to properly synchronize in the projection apparatus.

As illustrated in Fig. 1, A is the casing of a small size motion picture camera, having therein the reel B for the unexposed film strip and the reel C for the exposed strip. D is the feed roll driven at constant speed by mechanism not shown, and E and E' are idler rolls on opposite sides of the roll D which hold the film strip F in operative relation thereto. Between these rolls is the loop F' in the strip, which is actuated by the intermittent feed mechanism G to successively present and hold stationary portions thereof in registration with the picture lens H. The parts thus far described are all of usual construction and form no part of my invention.

It is usual to form sound records on a marginal portion of the strip on which the pictures are also recorded. The corresponding portions of the two records are not, however, adjacent, but are separated a predetermined distance which corresponds to that in the picture projecting and sound reproducing unit.

With my improved construction, the sound recording means is preferably located between the constant speed feed roller D and one of the reels B and C. As shown in Fig. 1, the sound recording unit I is placed between the roll D and reel B for the unexposed film and is constructed as follows:

J is a guide bearing for the film strip, which is of segmental form and is rigidly attached to the casing A by bolts K. Flanges J' and $J^2$ on this guide bearing and on opposite sides of the strip hold the latter from lateral displacement. L is a small electric lamp, preferably of the neon type, which is rigidly mounted on the opposite side of the bearing J from the segmental surface thereof. Preferably, this lamp is secured by a strap M which holds it in fixed position. N is an aperture formed through the bearing J for the passage of light from the lamp to the marginal portion of the strip. Within this aperture is located means for concentrating the light from the lamp, so that it will be directed in a thin short line extending transversely of the strip in a marginal portion thereof. The means preferably used for this purpose is a member O formed of "Lucite," which has the known property of redirecting the light passing therethrough. As shown, the member O has a concave surface O' which fits about a segment of the lamp L. The member O is then tapered, as indicated at $O^2$, into a smaller cross section $O^3$, which is again tapered at $O^4$ to a narrow edge $O^5$ adjacent to the strip, preferably not over .0025 of an inch in thickness. All of the surfaces of the member O, with the exception of O' and $O^5$, are coated with an opaque pigment, so that the only light discharged is that passing through the portion $O^5$. The portion $F^2$ of the strip which passes over the segmental guide is held thereagainst by an idler roller P which is mounted in a rock arm P' and yieldably pressed against the strip by the spring $P^2$.

With the construction as described, the lamp L is energized by a variable electric current which is conducted thereto from the microphone Q, the arrangement being such that the sound vibrations are translated into electrical impulses of varying intensity. Thus, the intensity of light passing through the portion $O^5$ and impinging on the sensitive strip will correspondingly vary in intensity, producing an exposure which will develop into a series of parallel, alternatively transparent, and opaque lines. Such record is capable of reproducing the original sound when passed through a suitable apparatus.

One important feature of the invention is that the strip guide and the light developing and directing means are in rigid relation to each other, so that there can be no relative vibrations which might distort the sound.

While my invention is not limited to any precise size of construction, the device illustrated is one which can easily be placed within a space of not over one-quarter of a cubic inch and with a dimension between the light source and film of less than one-half inch.

What I claim as my invention is:

The combination with a small size motion picture camera including a casing, a reel therein for the sensitive strip, and a closely associated roll for advancing the portion of the strip between the same and said reel at constant velocity, of sound recording means comprising a guide bearing sufficiently small to be located in the restricted space between said roll and reel being rigidly secured to said casing and having a convex surface over which said constant velocity portion of said strip is drawn, a microphonically controlled small low power electric lamp rigidly mounted on an opposite side of said guide bearing, and a member formed of "Loosite" located in an aperture through said guide bearing and having a concave face enveloping said lamp to receive light therefrom throughout a wide angle being adapted to concentrate the light from said lamp and direct the same in a narrow line extending transversely of a marginal portion of said strip.

HARRY M. KIRSCHBAUM.